Jan. 10, 1967 E. A. WAHL 3,297,203
MATERIAL FEEDER
Filed April 26, 1965 4 Sheets-Sheet 1

EUGENE A. WAHL
INVENTOR.

BY
ATTORNEY

Jan. 10, 1967  E. A. WAHL  3,297,203
MATERIAL FEEDER

Filed April 26, 1965  4 Sheets-Sheet 2

EUGENE A. WAHL
INVENTOR.

BY
ATTORNEY

EUGENE A. WAHL
INVENTOR.

EUGENE A. WAHL
INVENTOR.

United States Patent Office 3,297,203
Patented Jan. 10, 1967

3,297,203
MATERIAL FEEDER
Eugene A. Wahl, 294 Forest Ave.,
Glen Ridge, N.J. 07028
Filed Apr. 26, 1965, Ser. No. 450,925
20 Claims. (Cl. 222—44)

This invention relates to feeders providing a continuous stream of a particulate material and more particularly to a vibratory feeder of improved construction and operating accuracy.

Apparatus, of the class to which this invention is directed, is used for continuously discharging granular, powdered, and the like materials at a constant, predetermined rate as, for example, feeding a continuous stream of material into a process. It is highly desirable that apparatus of this type provide a continuous flow of the material at a predetermined, precise feed rate.

Various types of volumetric feeders are available but the problem has been to provide such apparatus of simple construction, yet, having a precise feed rate on a minute-to-minute basis. The problem is aggravated by the fact that materials have widely different flow characteristics as, for example, free-flowing granular materials and sticky, amorphous powders. Also, under normal operating conditions, powdered materials of the same composition may vary widely in density and certain materials resist flow under most all conditions of use other than those subject to elaborate moisture control. These and other variable factors effect the operating accuracy of the feeder.

Feeder apparatus, made in accordance with this invention, is of simple and rugged construction, and has an inherent operating accuracy exceeding that of volumetric feeders heretofore available.

An object of this invention is the provision of an improved material feeder having a high operating accuracy and capable of operating with a wide variety of granular and powdered materials having different flow characteristics.

An object of this invention is the provision of a vibratory feeder for dispensing granular, powdered, or the like materials at a precise, constant feed rate, which apparatus includes material receiving means for receiving material from a supply hopper, means to maintain a constant head load of the material in the material receiving means, and means to impart a pseudo-fluid characteristic to the material as it passes out of the material receiving means.

An object of this invention is the provision of a material feeder of the vibratory tray class, which feeder comprises a supply hopper spaced above the tray, an auxiliary hopper disposed between the supply hopper and the tray, said auxiliary hopper including an adjustable discharge orifice, and means vibrating the auxiliary hopper and the tray thereby to provide a positive discharge of the material from the supply hopper to the tray and the transport of the material along the tray.

An object of this invention is the provision of a vibratory tray feeder for providing a continuous flow of material at a predetermined, precise feed rate, which feeder comprises means for promoting a positive flow of the material from a supply hopper and into the tray, an adjustable vibratable orifice for controlling the rate of flow of the material into the tray, and means for maintaining a constant head load of the material between the supply hopper and the orifice.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
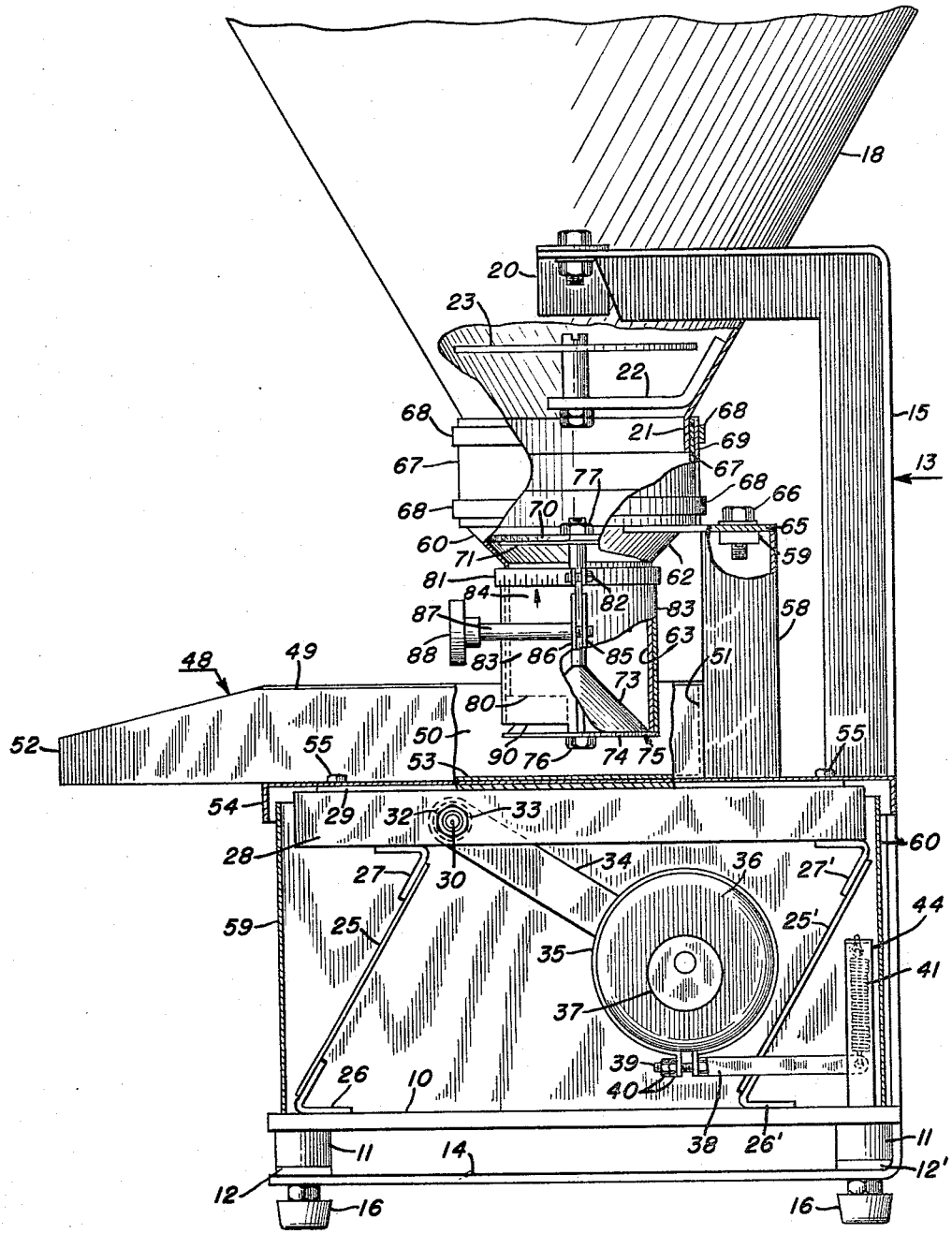
FIGURE 1 is a side elevational view of apparatus made in accordance with this invention, with certain parts broken away and certain parts shown in cross-section.
Figure 2:
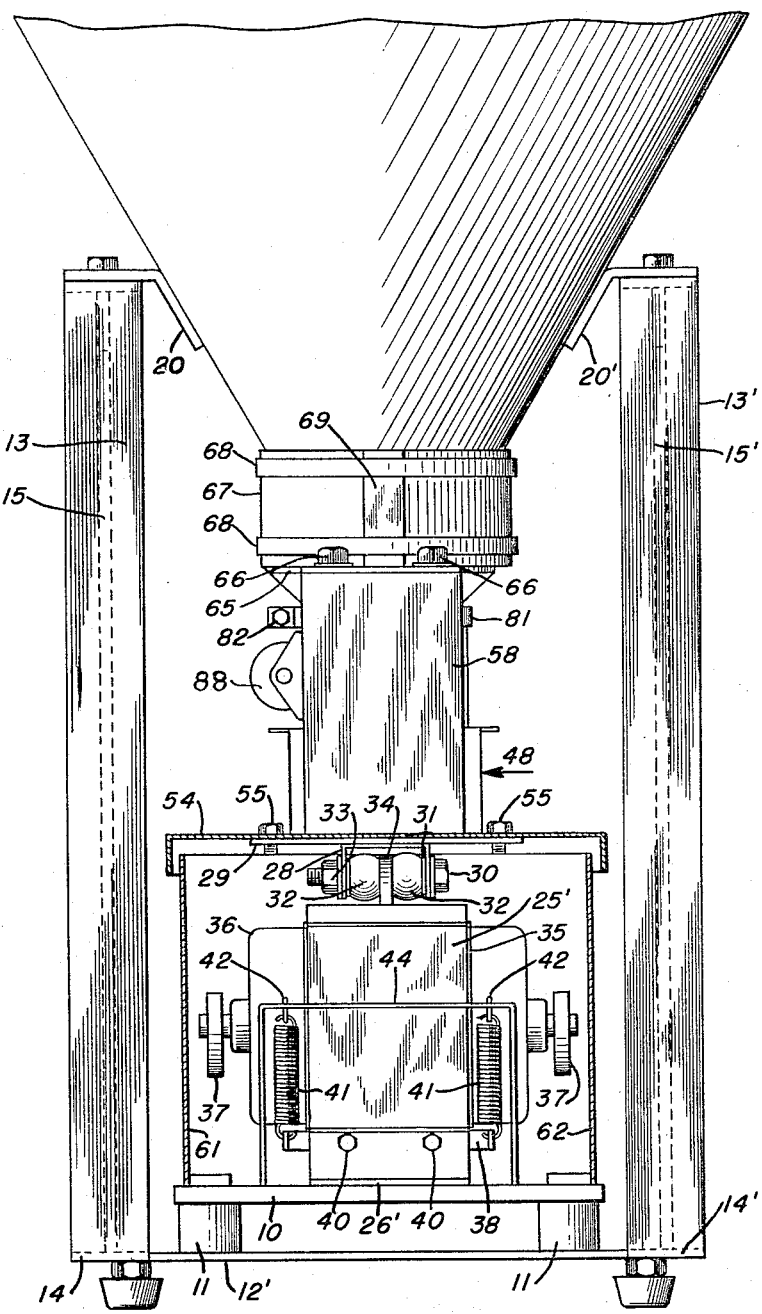
FIGURE 2 is a rear elevational view thereof.

Reference now is made to FIGURES 1 and 2. The apparatus is supported on a base 10, which base rests upon four vibration isolators 11. The forward two of said vibration isolators rest upon a forward cross-plate 12 and the rear two isolators rest upon a rear cross plate 12'. A pair of spaced, vertically-extending support posts 13, 13' each have their lower ends 14, 14' off-set at a right angle and underlying the base 10. These support posts are made of iron and have integral webs 15, 15' imparting structural rigidity thereto. The ends of the cross plates 12 and 12' span the associated off-set ends 14, 14' of the support posts and are secured thereto, as by welding. Threaded holes are formed through the off-set ends and the overlying ends of the cross plates, said holes receiving the screws of conventional rubber feet 16. These screws are threaded into holes provided in the vibration isolators and the feet are individually adjustable by means of nuts carried by the screws, for the purpose of leveling the apparatus.

The upper ends of the two, vertical support posts 13, 13' are also off-set at a right angle and span the conical supply hopper 18. Welded to the outer wall of the hopper are a pair of diametrically-opposed angle brackets 20, 20', whereby the hopper is removably secured in position by means of bolts and cooperating nuts passing through aligned holes formed in the angle brackets and the off-set ends of the vertical support posts. The apex of the hopper terminates in a cylindrical portion 21 forming the hopper discharge opening. A bracket arm 22, welded to the inner wall of the hopper, carries a circular baffle plate 23, which baffle plate has its peripheral surface spaced from the sloping wall of the hopper. Such baffle plate serves to remove the head load of the contained material from the region of the hopper discharge opening and the flow path of the material out of the hopper is defined by the annular space between the peripheral surface of the plate and proximate wall of the hopper. The baffle plate also serves to prevent discharge of the material predominantly along the hopper axis, thereby preventing possible rat-holing of the material and providing for a discharge of the material substantially on a first-in, first-out basis.

A pair of flexible leaf springs 25, 25' have ends secured to off-set brackets, the lower brackets 26, 26' being welded to the base 10 and the upper brackets 27, 27' being welded across the open ends of a U-shaped channel iron 28, which channel iron has its base portion welded to the lower surface of a rigid plate 29, as best shown in FIGURE 2. The arms of the U-shaped member 28 are provided with aligned holes receiving a fastening bolt 30 passing through a steel bushing 31 having secured thereto a vulcanized rubber sleeve 32. The bushing has a greater axial length than that of the rubber sleeve and, therefore, has its ends in contact with the legs of the bracket 28 when the nut 33 is tightened on the bolt 30. The rubber sleeve is force-fitted through a somewhat reduced-diameter hole formed in a crank arm 34. Thus, the sleeve and tis supporting bushing are secured against rotation relative to the crank arm. However, there is sufficient torsional resilience in the rubber to permit small angular movement of the crank arm relative to the steel bushing 31. This arrangement provides a rattle-free connection joint between the crank arm and the U-shaped bracket 28, which joint has considerable torsional freedom but great radial stiffness to transmit push-pull forces of the crank arm to the horizontal plate 29.

The crank 34 is welded to a wide strap 35 which surrounds the housing of a synchronous motor 36, said motor having a double-ended drive shaft to which are secured the eccentric weights 37. The strap 35 has offset, parallel end portions provided with aligned holes whereby the strap is pulled tightly around the motor housing and secured to the base portion of a generally horizontally-disposed, U-shaped arm 38, as by the bolts 39 and cooperating nuts 40. A pair of coiled springs 41 have their lower loops inserted through holes provided at the ends of the bracket arm 38 and their upper loops disposed in eye hooks 42 which are threaded in holes provided in the base portion of an inverted, U-shaped strap 44. The strap 44 has its ends welded to the base plate 10. The described arrangement suspends the motor while preventing the motor from sagging too far from the illustrated, desired position.

An elongated trough, or tray 48, has side walls 49, 50, a rear wall 51 and an open end 52 which constitutes the material discharge end of the apparatus. The bottom wall 53, of the tray, rests upon and is welded to a supporting plate 54 having offset, downwardly-depending sides. The plate 54 is provided with a plurality of holes receiving the fastening bolts 55, which bolts are threaded into holes provided in the horizontal plate 29. A hollow, generally-rectangular post 58 has its bottom welded to the supporting plate 54 and its contiguous forward wall welded to the rear wall 51 of the tray. It will be clear that the supporting plate 54, the tray 48 and the post 58 constitute a unitary assembly which is removably secured to the horizontal plate 29. The apparatus disposed below the supporting plate 54 is enclosed by vertical panels 59–62 removably secured to the base plate 10.

As the motor rotates, the eccentric weights revolve about the motor axis, thereby imparting gyrations to the motor in all directions within a vertical plane. The thrust forces, or impulses, which are perpendicular to the crank arm axis, are largely cancelled out since the motor is relatively free for displacements in this direction. However, the thrust forces applied along the crank arm axis are delivered, through the rubber sleeve 32, to the U-shaped bracket 28 and the horizontal plate 29 welded thereto. This results in vibration of the tray to transport any contained material to the discharge end 52. Simultaneous vibrations are imparted to the post 58.

Extending across the open top of the post 58, is a flat bar 59 having its ends welded to opposed side walls of the post and provided with longitudinally-spaced threaded holes. An auxiliary hopper 60 has a uniform-diameter base portion corresponding to the similar hopper portion 21 and a conical mid-portion 62 terminating in a cylindrical downspout 63. Welded to the outer wall of the conical portion 62 is a plate 65 which rests upon the vertical post 58, said plate being securely fastened to the post by two bolts 66 threaded into the holes of the cross bar 59. With the auixiary hopper 60 so secured in place, its upper end is axially spaced from the end 21 of the supply hopper 18 and the space between the two hoppers is closed by a resilient band 67, made of suitable material, such as rubber. The band is secured in place by a pair of conventional metal hose clamps 68 tightly secured in position by suitable latches. Interposed between the band 67 and the hose clamps is a vertical strip 69, of steel, and having a thickness of 1/8" and a width of 1", approximately, when the supply hopper has a discharge opening approximately 6 inches in diameter. The auxiliary hopper, being rigidly attached to the rectangular post 58, is subjected to vigorous, constant vibrations along with the tray. On the other hand, the supply hopper is supported by the rigid vertical posts 13, 13', which posts are vibrationally isolated from the rest of the apparatus by the vibration isolators 11. These vibration isolators cooperate with the vibratory tray system, including the base 10, to isolate the vibratory tray system from its environment. Specifically, if the supply hopper were rigidly connected to the base 10, the amplitude of the vibrations imparted to the tray and the auxiliary hopper would vary, depending upon the load in the supply hopper, thereby changing the feed rate of the apparatus. The vertical strip 69 transmits sufficient vibrations from the auxiliary hopper to the supply hopper to assure a positive flow of the contained material out of the supply hopper discharge opening.

Extending across the conical portion 62, of the auxiliary hopper, is a relatively thick but narrow cross bar 70 having ends welded to the hopper wall. Welded to this cross bar is a circular baffle plate 71 having its peripheral surface spaced from the conical hopper wall. A flow control cone 73, having a highly polished surface, has its base welded to a circular plate 74, of increased diameter, thereby forming a circular flange 75. A fastening bolt 76 passes through a central hole in the plate 74, the truncated apex of the cone, and holes formed in the baffle plate 71 and the cross bar 70. Thus, when the nut 77 is tightened on the bolt, the cone 73 is pulled up against the cylindrical downspout 63. The downspout has a cut-out wall portion, shown in dotted lines and identified by the numeral 80, which cut-out portion has an arcuate length of approximately 170 degrees and extends to the lower end of the downspout. It will be clear, now, that the cone 73 closes the normally open end of the downspout, except for the cut-out portion 80, which is presented to the front of the apparatus, that is, in the direction of the discharge end 52 of the tray.

Surrounding the downspout 66 and abutting the conical portion 62, of the auxiliary hopper, is a metal band 81 carrying scale graduations. This band has off-set parallel ends, one end having a clearance hole formed therein and the other end provided with a threaded hole, whereby the band is secured firmly in the illustrated position by a fastening screw 82. Completely surrounding the cylindrical downspout 63 is a metal sleeve 83 carrying a reference mark 84. This outer sleeve is split longitudinally from end to end and includes off-set, integral tabs 85, 86, the tab 85 being provided with a threaded hole for receiving the reduced-diameter, threaded end of the screw 87 and the tab 86 having a clearance hole for such threaded end. The screw 87 is provided with a handle 88 to facilitate unobstructed rotation of the screw in one or the other direction, thereby to tighten or loosen the outer sleeve 83 relative to the cylindrical downspout. The outer sleeve 83 also is provided with a cut-out wall portion 90, which cut-out portion extends to the end of the sleeve and has an arcuate length corresponding to the cut-out portion 80 of the downspout. However, the cut-out portion of the sleeve is of a smaller height, taken axially of the downspout, than the cut-out portion of the downspout. Assuming that the two cut-out portions 80 and 90 coincide, angularly, it will be apparent that the discharge orifice of the downspout is defined by the horizontal wall of the cut-out portion 90 and vertical walls of both cut-out portions and the proximate sloping surface of the cone 73. Such angular coincidence of the two cut-out portions constitutes the maximum orifice opening. Now, by turning the screw 87 in proper direction, the outer sleeve can be rotated about the cylindrical downspout by hand. If the sleeve is rotated 170 degrees, or more, the orifice will be completely closed. With the scale carried by the strap 81 calibrated in feed rate values, such as, for example, pounds per minute, the effective opening of the orifice can be set by aligning the reference mark 84 with the proper scale graduation thereby to provide a desired apparatus feed rate. Upon such setting of the apparatus feed rate, the screw 87 is turned to clamp the outer sleeve firmly in position relative to the downspout. The ends of the outer sleeve abut the strap 81 and the cone flange 75, thereby preventing axial displacement of the sleeve relative to the downspout 63 when the sleeve is loosened for the purpose of adjusting the arcuate size of the orifice.

It will be apparent that the maximum height of the orifice is determined by the longitudinal height of the sleeve slot 90. By using different outer sleeves each having cut-out portions of different height, such as ¼, ½, ¾ and 1 inch, the apparatus feed rate can have a range about 100 to 1, without requiring any other adjustments or replacement of components. In the given example, the 1.0 inch high cut-out portion in the particular outer sleeve will coincide with the cut-out portion of the downspout. For any given outer sleeve, the orifice opening will have a fixed height and the arcuate length of the orifice can be varied from fully-closed to 170 degrees open. As a practical minimum, the height of the slot in the outer sleeve may be taken as ¼ inch. Since the arcuate orifice length, when fully open, is approximately 6.0 inches on a 4.0 inch diameter sleeve, such sleeve will provide a 24 to 1 range of feed rate adjustment. Therefore, by having four sleeves each with ¼ inch higher openings, an overall range of feed rate adjustment is 96 to 1.

The operation of the apparatus will now be described, it here being pointed out that the tray is open at the top and that the downspout extends into the tray but is spaced from the bottom and side walls thereof. Upon energization of the motor, vigorous vibrations of constant frequency and amplitude are applied to the tray and to the auxiliary hopper and the components attached thereto. Material flows from the supply hopper and into the auxiliary hopper, the flow path of the material to the hopper discharge opening being defined by the arcuate gap between the hopper baffle plate and sloping side wall. As explained, above, this baffle supports the bulk of the material contained in the supply hopper, thereby preventing compacting of the material within the auxiliary hopper. In a practical sense, the discharge opening of the supply hopper is fairly large and the slight hopper vibrations transmitted from the auxiliary hopper to the supply hopper, as explained above, are sufficient to provide a positive flow of the material out of this hopper.

The material within the auxiliary hopper is subjected to vigorous vibrations and flows out of the described orifice. The sticking, bridging and compacting of material, particularly powdered material, is most critical at the point of maximum constriction of the material flow path. In the present apparatus, the material approaching the downspout orifice is subject to vigorous vibrations by the surface of the cone end and the proximate wall of the external sleeve encircling the downspout. The material within the auxiliary hopper, as well as the material passing through the orifice, is in such a vigorous state of vibration that it is, for all practical purposes, fluid. This desirable characteristic of the material would be adversely effected under conditions wherein there is a considerable and variable head load of the material over the discharge orifice. Thus, the baffle plate within the auxiliary hopper is essential to maintain a constant head load of the material over the orifice thereby to maintain a constant rate of flow of the material out of the downspout into the tray. Without such baffle plate, such material flow would be proportional to the head load, or pressure, from above which is a variable factor. On the other hand, the baffle plate within the supply hopper may or may not be used, depending upon the particular material being handled. A further feature contributing to the extraordinary accuracy of this feeder, is the fact that the vibrations imparted to the auxiliary hopper and the orifice remain absolutely constant and independent of any variable conditions, such as the quantity of material within the supply hopper.

The stream of material flowing into the tray strikes the vibrating tray bottom and is vibratorily moved toward the tray discharge end. As the material moves toward the open end of the tray, it spreads across the tray to a stream of substantially uniform depth and such stream is discharged, continuously, from the apparatus as long as material is supplied to the supply hopper either continuously, or on a batch basis.

The frequency and amplitude of the vibrations imparted to the auxiliary hopper and the tray remain constant and the apparatus feed rate is controlled by setting the arcuate length of the orifice opening. This eliminates the requirement for a costly motor control system and/or a variable gear drive, thereby resulting in significant economy of manufacture.

Figure 3:
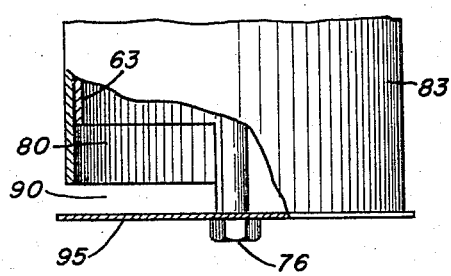
FIGURE 3 is a fragmentary view, with parts in cross-section, and showing a modification of the lower end of the auxiliary hopper.

A modification of the orifice construction is shown in the enlarged, fragmentary view of FIGURE 3. Here, a flat, circular disc 95 is clampingly secured against the lower end of the downspout 63 by means of the fastening bolt 76. The effective opening of the orifice now is defined by the relatively angular setting of the sleeve 83 and downspout and that portion of the disc underlying the cut-out wall portions 80 and 90.

Figure 4:
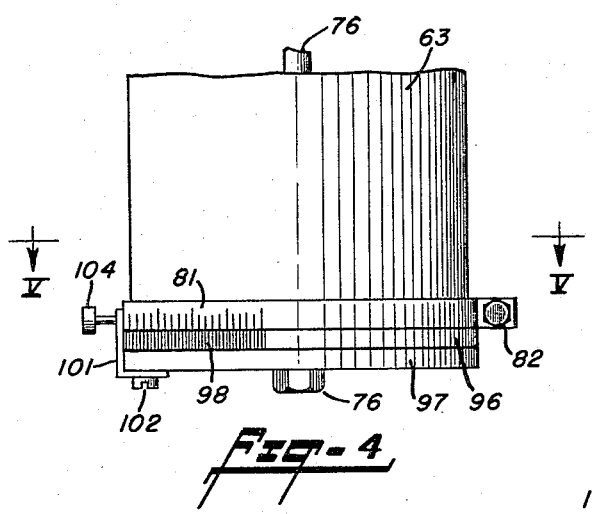
FIGURE 4 is a fragmentary side elevational view showing another modification of the lower end of the auxiliary hopper.
Figure 6:
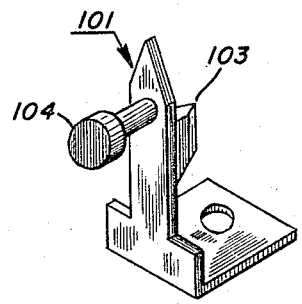
FIGURE 6 is an enlarged, isometric view of the index finger.
Figure 5:
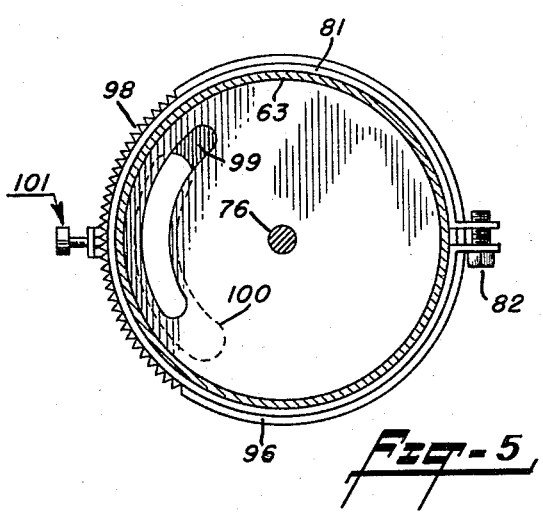
FIGURE 5 is a cross-sectional view taken along the line V—V of FIGURE 4.

Another modification of the lower end of the auxiliary hopper is shown in FIGURES 4 and 5, FIGURE 4 being a fragmentary, side elevational view and FIGURE 5 being a cross-sectional view taken along the line V—V of FIGURE 4. In this arrangement, the external cylindrical sleeve (sleeve 83 shown in FIGURE 1) is eliminated. Two circular discs 96 and 97 are clampingly secured against the lower end of the downspout 63 by the fastening bolt 76. A suitable spring washer, not shown, is disposed between the two discs whereby the disc 97 is rotatable relative to the disc 96. The strap 81, carrying the graduated scale, rests upon the upper disc 96 and is secured in fixed position about the downspout by the screw 82. A portion of the peripheral surface of the disc 96 has formed therein a plurality of teeth 98 which are in alignment with the graduation markings on the strap 81. Also formed in the disc 96 is an arcuate slot 99 located within the downspout. The lower disc 97 has a diameter corresponding substantially to the root diameter of the teeth 98, is provided with an arcuate slot 100, and has secured thereto an index finger 101 as by the screw 102. As shown in FIGURE 6, the index finger 101, made of a suitable spring material, has a pointed upper end and a radially-extending tab 103 welded thereto. A headed rod 104 has an end threaded into a hole provided in the finger. When the index finger is secured to the disc 97, the tab 103 is disposed in one of the teeth formed in the disc 96 and the pointed finger end is aligned with a mark on the strap 81. By pulling upon the headed rod 104, the index finger can be flexed to free the tab from the teeth, whereby the disc 97 can be rotated relative to the disc 96. With the graduations of the strap 81 calibrated in values of feed rate, the alignment of the index finger with a particular graduation results in a proper overlapping of the slots 99 and 100 to provide the indicated rate of flow of material out of the auxiliary hopper and into the tray.

Figure 7:
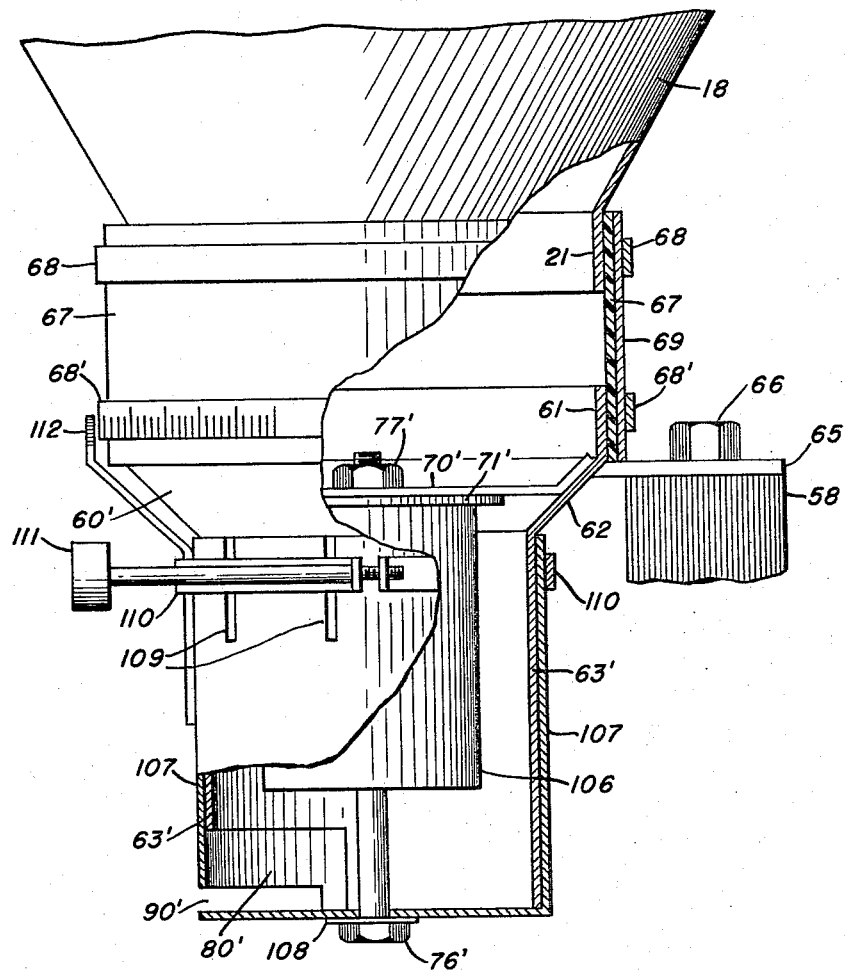
FIGURE 7 is a fragmentary, side elevational view with parts in section, and showing another modification of the auxiliary hopper.

Reference now is made to FIGURE 7, which is a fragmentary, side elevational view, with parts in section, and showing another construction of the auxiliary hopper. The auxiliary hopper 60' is of the same general shape as the auxiliary hopper 60 shown in FIGURE 1, having a uniform diameter material-receiving portion 61, a funnel-shaped intermediate portion 62 and a cylindrical downspout 63', the latter being somewhat shorter than the downspout 63 shown in FIGURE 1. The material-receiving end 61 is spaced from the similar portion 21 of the supply hopper 18 and the space between the two hoppers is closed by the resilient band 67. Such band is secured to the two hoppers by the hose clamps 68 and 68', the clamp 68' being provided, in this construction, with a scale of graduations, as shown.

As in the FIGURE 1 construction, the auxiliary hopper 60' is removably secured to the rigid post 58 by the bolt 66. A cross bar 70' has off-set ends welded to the sloping wall of the auxiliary hopper, said cross bar having welded thereto the baffle plate 71', the peripheral surface of the baffle plate being spaced from the sloping wall portion, thereby defining an arcuate path for the flow of the material into the downspout 63'. A depending tubular member 106 has its upper end welded to the baffle plate 70', said member being spaced from the inner wall of the downspout and having its lower end lying in a plane proximate to the vertical wall defining the cut-out wall portion of the downspout. This cut-out wall portion has an arcuate length of some 170 degrees.

An external cylindrical member 107 has a closed bottom abutting the lower end of the downspout 63' and is retained in position by the central bolt 76', spring washer 108 and the nut 77'. The member 107 is rotatable around the downspout and is provided with a cut-out wall portion 90' having the same arcuate length as the downspout cut-out wall portion 80' but a shorter height. It will be apparent that the cut-out wall portions 80' and 90' constitute the orifice of the auxiliary hopper and that the size of such orifice can be adjusted by rotation of the external cylindrical member 107 about the downspout.

The external cylindrical member 107 is provided with a plurality of spaced, longitudinally-extending slots, two such slots 109 being visible in the view of FIGURE 7. Encircling the upper portion of member 107 is a flat strap 110 having off-set parallel ends whereby the strap may be drawn tightly about said member by means of a headed rod 111 having a reduced-diameter, threaded end, in the same manner as has been described with reference to the screw 87 and the outer sleeve member 83 shown in FIGURE 1.

Welded to the outer wall of the external cylindrical member 107 is a rigid indicator member 112 having a pointed end cooperating with the scale graduations carried by the clamping strap 68', which scale is calibrated in terms of feed rates. Thus, to set the apparatus feed rate to a desired value, the rod 111 is rotated to loosen the clamping strap 110 and the cylindrical member 107 is rotated, as by means of the rigid indicator member, to align the end of the indicator member with the appropriate scale graduation.

Material flows to the bottom of the auxiliary hopper along a circular path defined by the spacing between the inner cylindrical member 106 and the inner wall of the downspout 63' and such material is discharged from the auxiliary hopper through the adjustable orifice defined by the overlapping cut-out wall portions 90' and 80'. The material within the auxiliary hopper is subjected to vigorous vibrations by the downspout, the inner cylindrical member and the bottom of the outer cylindrical member. This effectively fluidizes the material, prevents packing of the material at the bottom of the auxiliary hopper and results in positive, continuous flow of the material out of such hopper.

Using flour, which is a difficult material to meter, tests made on a feeder constructed and arranged as disclosed herein show an operating accuracy of better than 1 percent on a minute-to-minute basis. Such accuracy is maintained over the entire feed rate range of the apparatus. This extraordinary accuracy is achieved by the maintenance of a constant head load of the material over the orifice and maintaining a constant vibration of the auxiliary hopper and the orifice irrespective of the quantity of material in the supply hopper.

Various constructions of the auxiliary hopper have been illustrated and described in combination with a tray to form a vibratory tray feeder. This is not to be construed as restricting the inventive features to such particular apparatus. The control of the material head load, within the auxiliary hopper, the construction of the lower end of such hopper and the adjustable orifice, together with the described vibration of the auxiliary hopper and orifice, result in a continuous discharge of the material from the auxiliary hopper at a precise feed rate. Consequently, the tray may be omitted, whereby the material is discharged from the auxiliary hopper directly into a process stream.

Having now described the invention, those skilled in this art will be able to make various changes and modifications without thereby departing from the spirit and scope of the invention as recited in the following claims.

I claim:

1. In apparatus for discharging particulate material at a constant predetermined rate from a supply hopper having a discharge opening, the combination of,
    (a) an auxiliary hopper comprising a conical portion terminating in a vertical downspout, said hopper having a material-receiving opening at the conical end and an adjustable outlet orifice at the lower end of the downspout,
    (b) means supporting the auxiliary hopper with its material-receiving opening disposed to receive material from the supply hopper discharge opening,
    (c) a baffle member disposed within and secured to the auxiliary hopper, the peripheral surface of said baffle member being spaced from the wall of the auxiliary hopper to define a flow path for material to the said outlet orifice, and
    (d) means vibrating the auxiliary hopper and outlet orifice at a constant frequency and amplitude.

2. The invention as recited in claim 1, wherein said downspout is cylindrical and has a cut-out wall portion extending to the lower end thereof; and including a rotatable sleeve member encircling said downspout and having a cut-out wall portion extending to the lower end thereof, and a closure means closing the lower ends of the downspout and sleeve member, said cut-out wall portions and said closure means defining the said outlet orifice.

3. The invention as recited in claim 2, wherein the said closure means comprises a conical member having a base flange, said conical member having its apex disposed in the downspout and the base flange abutting the ends of the downspout and sleeve member.

4. The invention as recited in claim 2, wherein the said closure means comprises a flat disc engaging the ends of the downspout and sleeve member.

5. The invention as recited in claim 2, wherein the said rotatable sleeve member has a closed bottom which forms the said closure means, and including an internal tubular member having an end secured to the said baffle member and extending into said downspout, said tubular member having its outer wall spaced from the inner wall of the downspout.

6. The invention as recited in claim 2, including scale graduations carried by the downspout and a reference member carried by said sleeve member, said reference member being alignable with a selected scale graduation upon rotation of the sleeve member about the downspout.

7. The invention as recited in claim 6, wherein the said sleeve member is a split band; and including means operable to clampingly secure the sleeve member in fixed position to the downspout and to release the sleeve member for rotation about the downspout.

8. The invention as recited in claim 1, wherein the said outlet orifice comprises overlapping openings formed in a pair of flat plates, and including means mounting the said plates to close the said other end of the auxiliary hopper while affording rotation of one plate relative to the other, and means for securing the two plates together at a selected relative angular orientation.

9. The invention as recited in claim 1, in combination with an elongated tray having an open end and positioned to receive material from the outlet orifice of the auxiliary hopper, and means vibrating the tray to transport material in the tray toward the open end thereof.

10. The invention as recited in claim 9, wherein the auxiliary hopper and the tray are vibrated by a common means.

11. A vibratory tray feeder comprising,
 (a) a base,
 (b) a supply hopper supported from said base and having a discharge opening at the bottom,
 (c) resilient means vibrationally isolating the supply hopper from the base,
 (d) a supporting plate vibratorily supported by said base,
 (e) an auxiliary hopper having a material-receiving opening aligned with the supply hopper discharge opening and having a downspout,
 (f) means securing the auxiliary hopper to said supporting plate,
 (g) an internal baffle secured to said auxiliary hopper and defining a flow path for material into the downspout,
 (h) means closing the end of the downspout,
 (i) means forming a cut-out portion in the wall of the downspout and extending to the end thereof,
 (j) an elongated tray secured to said supporting plate, said tray having a bottom spaced from the end of said downspout and an open end, and
 (k) means vibrating said supporting plate at a constant frequency and amplitude and in a direction to vibratorily transport material to the open end of the tray.

12. The invention as recited in claim 11, wherein the said supporting plate is supported on said base by a pair of flexible leaf springs and wherein the means vibrating the said supporting plate comprises a synchronous motor having a double-ended drive shaft, eccentric weights secured to the drive shaft, a crank arm secured to the motor housing and mechanically-coupled to the said supporting plate, and spring means suspending the motor between said base and supporting plate.

13. The invention as recited in claim 11, including a sleeve member encircling said downspout and having a cut-out wall portion extending to the end thereof, said sleeve member being rotatable about said downspout; means for clampingly securing said sleeve member to the downspout; and wherein the said means closing the end of the downspout comprises a conical member having a flange portion abutting the end of the downspout and an apex extending into the downspout.

14. The invention as recited in claim 13, including scale graduations carried by the downspout and a reference indicator carried by the sleeve member and alignable with a selected scale graduation upon rotation of the sleeve member about the downspout.

15. The invention as recited in claim 11, wherein the auxiliary hopper has a uniform diameter portion constituting the said material-receiving opening, and a conical portion joined to said downspout; and wherein the said baffle member is a circular plate having a peripheral surface spaced from the inner wall of the said conical portion, and including a tubular member secured to said circular plate, said tubular member extending into and spaced from the downspout.

16. A vibratory tray feeder for discharging a continuous stream of powdered material at a constant predetermined feed rate comprising,
 (a) a base,
 (b) a pair of upright support posts,
 (c) means including vibration isolators securing said support posts to the base,
 (d) a conical supply hopper having a discharge opening formed in the bottom,
 (e) means securing the supply hopper to said support posts,
 (f) a supporting plate,
 (g) a pair of leaf springs supporting the said supporting plate from the said base,
 (h) a rigid support secured to the supporting plate,
 (i) an auxiliary hopper secured to said rigid support, said hopper having a material-receiving opening aligned with the supply hopper discharge opening and a cylindrical downspout having a cut-out wall portion extending to the end thereof,
 (j) a sleeve member surrounding said downspout and having a cut-out wall portion extending to the end thereof,
 (k) means for clampingly securing the sleeve member in fixed position relative to the downspout,
 (l) closure means closing the ends of the sleeve member and downspout,
 (m) an internal baffle plate carried by said auxiliary hopper and defining a flow path for material into said downspout,
 (n) an elongated tray having an open end and secured to said supporting plate, said tray having a bottom spaced from said downspout, and
 (o) power means for vibrating the said supporting plate at a constant frequency and amplitude in a direction to vibratorily transport material to the open end of the tray.

17. The invention as recited in claim 16, wherein the said closure means is a conical member having a base flange, said conical member having an apex extending into the downspout and the base flange abutting the ends of the downspout and sleeve member.

18. The invention as recited in claim 17, including a scale of graduations carried by the auxiliary hopper and a reference indicator carried by the said sleeve member and cooperating with said graduations.

19. The invention as recited in claim 16, wherein the said sleeve member has a closed bottom forming the said closure means; and including a cylindrical member secured to the said baffle member, said cylindrical member extending into the downspout and having its external wall spaced from the inner wall of the downspout.

20. The invention as recited in claim 19, including a scale of graduations carried by the auxiliary hopper and a reference indicator carried by said sleeve member and cooperating with said graduations.

References Cited by the Examiner
UNITED STATES PATENTS 3,062,414 11/1962 Morris _____ 222—199 X
3,124,278 3/1964 Cox _____ 222—196

ROBERT B. REEVES, *Primary Examiner.*

STANLEY H. TOLLBERG, *Examiner.*